United States Patent
Kikuchi et al.

(10) Patent No.: US 6,720,047 B2
(45) Date of Patent: Apr. 13, 2004

(54) HEAT RESISTANT BLOW MOLDED CONTAINERS

(75) Inventors: Atsushi Kikuchi, Kawasaki (JP); Norihisa Hirota, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 41 days.

(21) Appl. No.: 10/019,557

(22) PCT Filed: Apr. 27, 2001

(86) PCT No.: PCT/JP01/03734

§ 371 (c)(1),
(2), (4) Date: Dec. 31, 2001

(87) PCT Pub. No.: WO01/83197

PCT Pub. Date: Nov. 8, 2001

(65) Prior Publication Data

US 2003/0104146 A1 Jun. 5, 2003

(30) Foreign Application Priority Data

May 2, 2000 (JP) .......................................... 2000-133651

(51) Int. Cl.$^7$ ................................................. B65D 1/02
(52) U.S. Cl. ...................................... 428/35.7; 264/322
(58) Field of Search ........................... 428/35.7; 264/322

(56) References Cited

U.S. PATENT DOCUMENTS 5,906,286 A      5/1999   Matsuno et al.

FOREIGN PATENT DOCUMENTS

JP          10-35638 A      2/1998

*Primary Examiner*—Sandra M. Nolan
(74) *Attorney, Agent, or Firm*—Sughrue Mion, PLLC

(57) ABSTRACT

A stretch-blow-molded container obtained by biaxially stretching and blow-molding a thermoplastic polyester and which exhibits heat resistance or heat resistance and pressure resistance to withstand sterilization by heating at the time of hot filling. The stretch-blow-molded container is obtained by stretch-blow-molding a preform formed of a thermoplastic polyester as a chief component, wherein the body portion, bottom portion and shoulder portion are stretch-oriented, and at least the central portion in the bottom has an endothermic peak (B) due to the extinction of pseudo crystals in a temperature region higher than a glass transition point of the polyester but lower than a temperature at which the crystals of the polyester start melting as measured by using a differential scanning calorimeter (DSC).

8 Claims, 7 Drawing Sheets

HEAT RESISTANT BLOW MOLDED CONTAINERS

TECHNICAL FIELD

The present invention relates to a stretch-blow-molded container which is obtained by biaxially stretching and blow-molding a thermoplastic polyester and which exhibits heat resistance or heat resistance and pressure resistance to withstand sterilization by heating at the time of hot filling.

BACKGROUND ART

Containers obtained by biaxially stretching and blow-molding a thermoplastic polyester such as polyethylene terephthalate (PET) exhibit excellent transparency and surface luster, as well as shock resistance, rigidity and gas-barrier property required for the bottles, and have been used as bottle containers, i.e., as bottles for containing various kinds of liquids.

In producing bottled products, in general, it is necessary to effect the sterilization or pasteurization by heating after a content such as juice, tea or the like has been hot-filled or after a content such as carbonated beverage containing juice has been filled, in order to enhance preservability of the content. However, the bottles made of a polyester have poor heat resistance and undergo a deformation or undergo a contraction causing the volume to change due to heat at the time of hot-filling the content or at the time of sterilization or pasteurization by heating. It is therefore an accepted practice to subject the biaxially stretched blow-molded containers to the step of heat-setting.

Japanese Examined Patent Publication (Kokoku) No. 22862/1994 discloses a heat resistant and pressure resistant container with a semispherical bottom portion, which is provided with a base cup to impart self-standing performance. According to this method of producing containers, a preform having a bottom portion and a mouth-and-neck portion spherulized by heating is biaxially stretched and blow-molded to stretch the whole container at a high stretching ratio except the spherulized portions. Upon effecting the stretch-blow-molding while holding the spherulized bottom portion of the preform with a stretching rod, in particular, the thickness can be decreased up to the peripheral edges of the central spherulized portion in the bottom in a sufficiently highly stretched state. The container having a semispherical bottom portion of which the thickness is decreased in the highly stretched state, exhibits excellent resistance against the heat and pressure, and is capable of sufficiently withstanding the processing of filling a content such as a juice-containing carbonated beverage that must be sterilized and that is likely to produce a pressure, and withstanding the processing of heat-sterilization which flows hot water onto the filled content (according to regulations, at 65° C. for not shorter than 10 minutes).

Further, Japanese Unexamined Patent Publication (Kokai) No. 42586/1993 discloses a method of producing a plastic bottle having a self-standing bottom portion relying upon a two-step blow-molding method which includes a primary biaxial-stretch-blow molding and a secondary biaxial-stretch-blow molding. In the Working Examples thereof, there has been described that the thickness of the bottom portion can be decreased to 1.6 mm at the central portion, and the thickness can be decreased to 1.16 to 0.36 mm from the center of the bottom through up to the body portion.

Japanese Patent No. 2917851 proposed by the present applicant teaches a method of producing heat resistant and pressure resistant self-standing plastic container which is obtained by blow-molding a preform-molded article heated at a stretching temperature, and of which the bottom portion includes a plurality of foot portions and valley portions, the valley portions substantially forming part of a semispherical surface, wherein a method of producing biaxially stretched plastic bottles having excellent heat resistance and pressure resistance, comprises:

a step of obtaining a secondary molded article by biaxially stretching and blow-molding the preform-molded article, the portion of said secondary blow-molded article that becomes the bottom portion of the final container having a surface area larger than the surface area of said semispherical surface and, further, having a roughly dome-shaped bottom portion which is relatively highly stretched to possess a thickness of not larger than 1 mm except the central portion of the bottom;

a step of obtaining a tertiary molded article by causing part of the bottom portion of said secondary molded article and part of the body portion continuous to the bottom portion to be opposed to an infrared-ray radiating member, so that the opposing portions are contracted by heating, the portion that becomes the bottom portion of the final container having a such size that can be held in the semispherical surface and is relatively close to the semispherical surface; and a step of obtaining a final product by subjecting the tertiary molded article in a heated state to the secondary blow-molding in a metal mold.

The container having the semispherical bottom portion of a decreased thickness due to stretching and, particularly, having a spherulized central portion of the bottom, exhibits excellent resistance against the heat and pressure, and is capable of sufficiently withstanding the processing for filling the content such as a juice-containing carbonated beverage that may produce a pressure and the heat-sterilization processing by pouring hot water onto the filled content (according to regulations, at 65° C. for not shorter than 10 minutes) requiring, however, a cumbersome operation of forming a base cup separately from the container and securing it to the container with an adhesive. Further, the container of which the central portion of the bottom is crystallized is accompanied by such problems as deteriorated appearance and giving an incorrect impression of sedimentation of the content to the consumers.

The plastic bottle having a plurality of foot portions and a plurality of valley portions that are alternatingly arranged, and having a thickness which is very decreased due to stretching except the central portion of the bottom, exhibits advantages of excellent resistance against the heat and pressure and excellent self-standing performance even after heat-sterilization. However, this plastic bottle is still accompanied by such problems as insufficient degree of stretching at the centeral portion of the bottom, insufficient degree of crystallization, imposing limitation on its heat resistance and pressure resistance, and leaving much room for improvement.

DISCLOSURE OF THE INVENTION

In studying a container obtained by stretch-blow-molding a polyester, the present inventors have discovered that a pseudo crystalline structure which is independent from the crystals inherent in the polyester can be introduced into at least the central portion of the bottom, and that introduction of the pseudo crystalline structure helps improve the heat resistance at temperatures lower than the melting point of the pseudo crystals and, hence, strikingly improve the heat resistance or the resistance against heat and pressure, as well as the self-standing performance of the container after the sterilization particularly when the container has a bottom portion constituted by a plurality of foot portions and a plurality of valley portions.

According to the present invention, there is provided a stretch-blow-molded container obtained by stretch-blow-molding a preform formed of a thermoplastic polyester as a chief component, wherein the body portion, bottom portion and shoulder portion are stretch-oriented, and at least the central portion in the bottom has an endothermic peak (B) due to the extinction of pseudo crystals in a temperature region higher than a glass transition point of the polyester but lower than a temperature at which the crystals of the polyester start melting as measured by using a differential scanning calorimeter (DSC).

In the stretch-blow-molded container of the present invention, it is desired that:

1. An endothermic amount at the endothermic peak (B) due to the extinction of the pseudo crystals is not smaller than 8% and, particularly, from 10 to 20% of the melting endothermic amount of the crystals;
2. The shoulder portion, too, has an endothermic peak (S) due to the extinction of the pseudo crystals in a temperature region higher than the glass transition point of the polyester but lower than the temperature at which the crystals of the polyester start melting as measured by using the differential scanning calorimeter (DSC);
3. An endothermic amount at the endothermic peak (S) due to the extinction of the pseudo crystals is not smaller than 5% and, particularly, from 7 to 15% of the melting endothermic amount of the crystals;
4. An endothermic amount at the endothermic peak (B) due to the extinction of the pseudo crystals is the greatest in the central portion of the bottom, next greatest in the shoulder portion and is the smallest in the body portion in a temperature region higher than the glass transition point of the polyester but lower than the temperature at which the crystals of the polyester start melting;
5. The container is obtained through a primary blow-molding of the preform, through the heat-treatment of the bottom portion, body portion and shoulder portion of the primary blow-molded article, and through the secondary blow-molding of the heat-treated article; and
6. The bottom portion is constituted by foot portions and valley portions alternatingly arranged in the circumferential direction, the valley portions having a self-standing structure located on an imaginary curved plane protruding downward in the axial direction of the container.

BEST MODE FOR CARRYING OUT THE INVENTION

Figure 1:
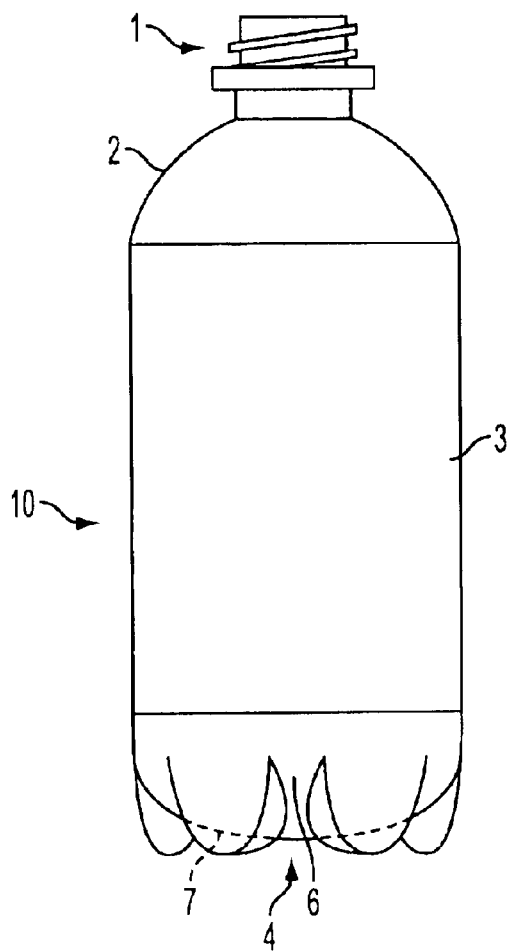
FIG. 1 is a side view for illustrating a stretch-blow-molded container according to the present invention.

A stretch-blow-molded container of the present invention will now be described with reference to FIG. 1. The container includes a mouth-and-neck portion 1, a shoulder portion 2, a body portion 3 and a bottom portion 4 formed by biaxially stretching and blow-molding a resin, the bottom portion 4 having a central portion 5 of the bottom as well as a plurality of valley portions 6 and a plurality of foot portions 7 alternatingly arranged along the periphery thereof. The valley portions 6 are located on an imaginary curved plane protruding toward the bottom, and the foot portions 7 are located among the valley portions and are protruding toward the bottom beyond the valley portions 6. The foot portions 7 are grounded at tip portions 8 that are extending outward in the radial direction and in the axial direction from their central root portions.

The shoulder portion 2, body portion 3 and bottom portion 4 of the container are stretch-oriented.

The shoulder portion 2, body portion 3 and bottom portion 4 have a crystal structure of a polyester used for producing the container. Here, at least the central portion 5 of the bottom possesses pseudo crystals in addition to the above-mentioned crystals.

The presence of crystals of the polyester is observed as an endothermic peak (A) due to the melting crystals as measured by using a differential scanning calorimeter (DSC), and the presence of pseudo crystals, too, is observed as an endothermic peak (B) due to the extinction of the pseudo crystals as measured by using the differential scanning calorimeter.

The measurement was taken by using the differential scanning calorimeter while raising the temperature of the samples at a rate of 10° C./min from 20° C.

The stretch-blow-molded container of the present invention has, in at least the central portion 5 of the bottom, the endothermic peak (B) in the temperature region higher than the glass transition point (Tg) of the polyester but lower than the temperature (Tm') at which the crystals of the polyester start melting.

Figure 2:
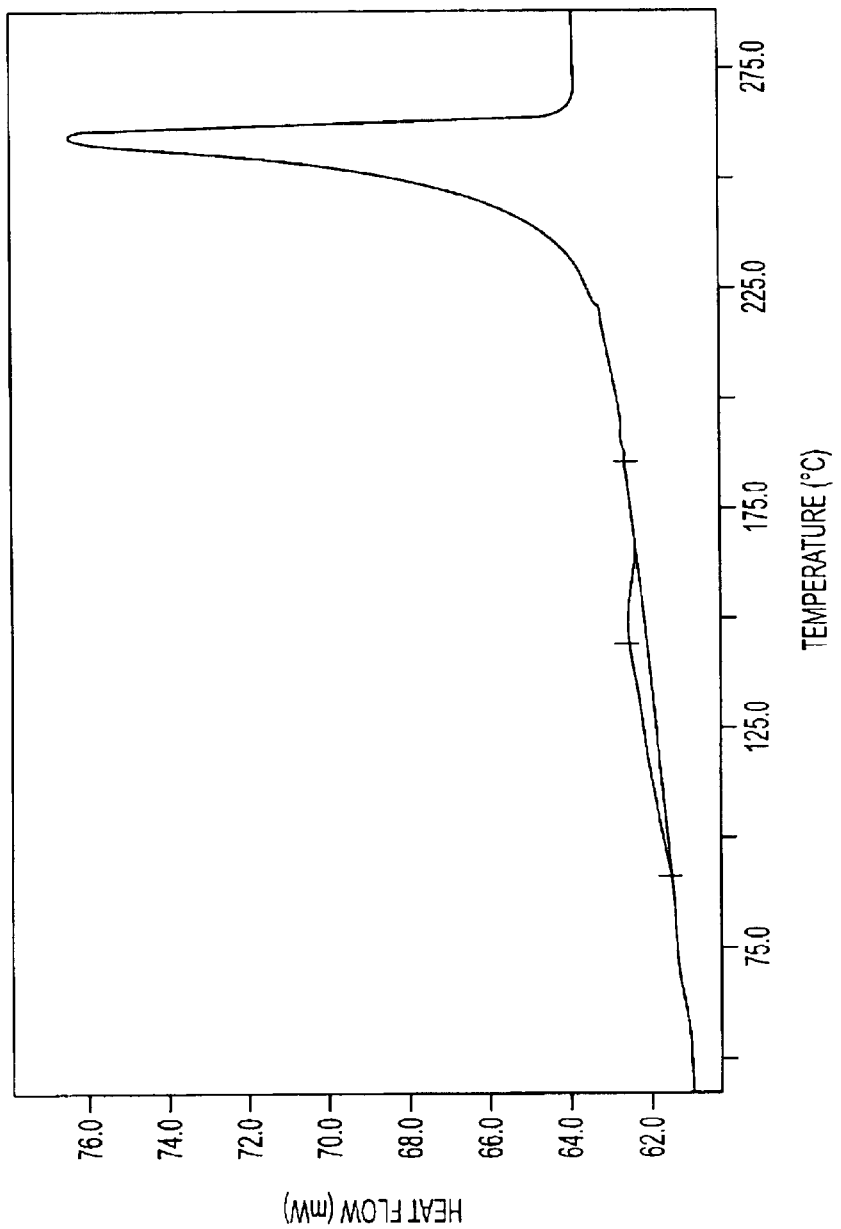
FIG. 2 is a diagram illustrating a curve of measurement of a polyester at the central portion of the bottom (residual gate portion) of the container of the present invention as measured by using a differential scanning calorimeter.

Among the accompanying drawings, FIG. 2 is a diagram illustrating a curve of measurement of the polyester at the central portion of the bottom (residual gate portion) of the container of the present invention as measured by using the differential scanning calorimeter, exhibiting an endothermic peak (B) due to the melting pseudo crystals on the low temperature side in addition to an endothermic peak (A) due to the melting crystals.

Figure 5:
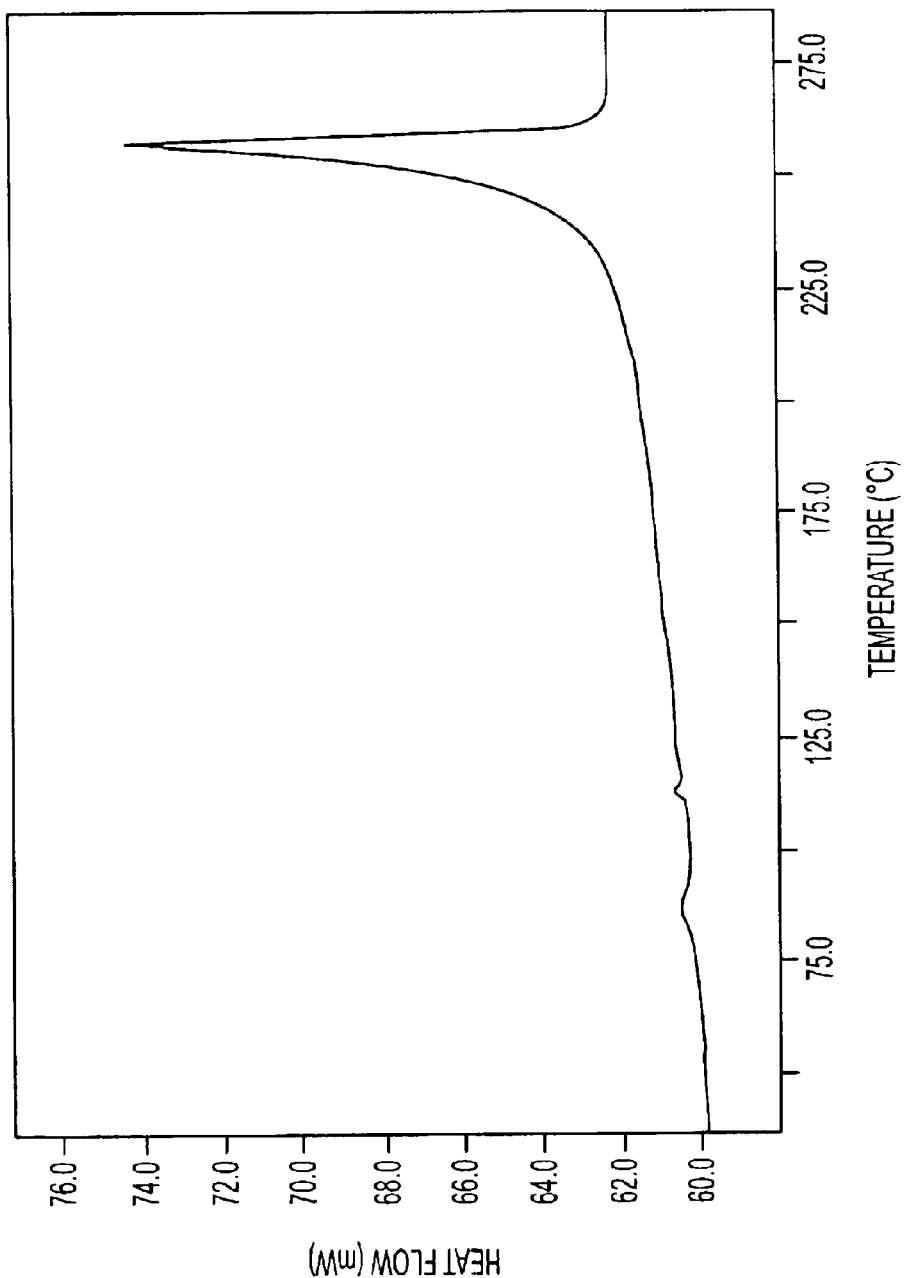
FIG. 5 is a diagram illustrating a curve of measurement of the polyester at the central portion of the bottom (residual gate portion) of the container of an ordinary biaxially stretched blow-molded container by using the differential scanning calorimeter.

FIG. 5 is a diagram illustrating a curve of measurement of the polyester at the central portion of the bottom (residual gate portion) of the container of an ordinary biaxially stretched blow-molded container by using the differential scanning calorimeter, exhibiting an endothermic peak (A) due to the melting crystals but without exhibiting endothermic peak (B) due to the melting pseudo crystals.

Crystals of the polyester usually include oriented crystals and thermal crystals. In these crystals, the molecules are assuming a low energy state like the ordinary crystals, and are establishing a stable-structure in this state.

In the oriented crystals of the polyester other than the lamella crystals, the crystallinity is about 40% at the greatest, and the remaining polyester is existing in an amorphous state hindering the heat resistance.

As described earlier, the present inventors have discovered that a pseudo crystalline structure which is independent from the crystals inherent in the polyester can be introduced into at least the central portion of the bottom, and that introduction of the pseudo crystalline structure helps improve the heat resistance at temperatures lower than the melting point of the pseudo crystals and, hence, strikingly improve the heat resistance or the resistance against heat and pressure, as well as the self-standing performance of the container after the sterilization particularly when the container has a bottom portion constituted by a plurality of foot portions and a plurality of valley portions.

That is, in the container of the present invention, the amorphous polyester in at least the central portion of the bottom forms a pseudo crystalline structure which is stable assuming an energy state lower than that of the simple amorphous polyester, contributing to improving the heat resistance at temperatures lower than the temperature at which the pseudo crystals extinguish.

In the container of the present invention, emphasis must be placed on an advantage stemming from the polyester forming pseudo crystals in the central portion of the bottom. In the container of the self-standing structure in which the foot portions and the valley portions are alternatingly arranged, in particular, the central portion of the bottom is at the lowest position except the downwardly protruding foot portions. If the central portion of the bottom protrudes downward due to creeping, the container loses the self-standing stability. In the container of the present invention, however, the deformation due to creeping is prevented by the formation of the pseudo crystals, improving the heat resistance, resistance against heat and pressure, and self-standing stability.

It is desired that the endothermic amount at the endothermic peak (B) in at least the central portion of the bottom of the container of the invention is not smaller than 8% and, particularly, in a range of from 10 to 20% of the endothermic amount at the melting endothermic peak (A) of the crystals from the standpoint of accomplishing the object of the invention.

When the endothermic amount at the endothermic peak (B) in the central portion of the bottom becomes smaller than the above-mentioned range, the heat resistance, resistance against heat and pressure, and self-standing stability tend to become smaller than when the above-mentioned endothermic amount lies within the above-mentioned range.

Limitation, however, is imposed on the formation of the pseudo crystals. That is, when the endothermic amount at the endothermic peak (B) is too large, the acrystallinity becomes low, which is not desirable from the standpoint of the container strength or the heat resistance. It is, therefore, desired that the endothermic amount lies within the above-mentioned range.

The melting point (Tm) found as a peak temperature at the melting endothermic peak (A) of the crystals of the polyester constituting the container of the present invention varies depending upon the kind of the polyester and upon the degree of stretching, but is, usually, in a range of from 200 to 280° C. and, particularly, from 220 to 270° C.

The peak temperature at the endothermic peak (B) due to the extinction of the pseudo crystals lies in the range described above. Here, a preferred range should be so determined that the pseudo crystals are not extinguished during the sterilization by heating by taking into consideration the temperature for sterilizing the container by heating. From the standpoint of the hot filling or the sterilization by hot water that are generally employed, it is desired that the peak temperature is in a range of from 90 to 180° C.

The biaxially stretched blow-molded container of the present invention may be obtained by an ordinary biaxially stretched blow-molding of one step. Preferably, however, it is obtained by primary blow-molding the preform, heat-treating the bottom portion, body portion and shoulder portion of the primary blow-molded article, and secondary blow-molding the heat-treated article.

In the step of production, the heat treatment conducted between the primary blow molding and the secondary blow molding affects the formation of pseudo crystals, i.e., affects the endothermic peak (B), and the amount of distortion in the secondary blow molding affects the intensity of the endothermic peak (B).

In relation to the above-mentioned operation of production, the shoulder portion, too, of the container of the present invention has an endothermic peak (S) due to the extinction of the pseudo crystals in a temperature region higher than the glass transition point of the polyester but lower than the temperature at which the crystals of the polyester starts melting as measured by using the differential scanning calorimeter (DSC).

Figure 3:
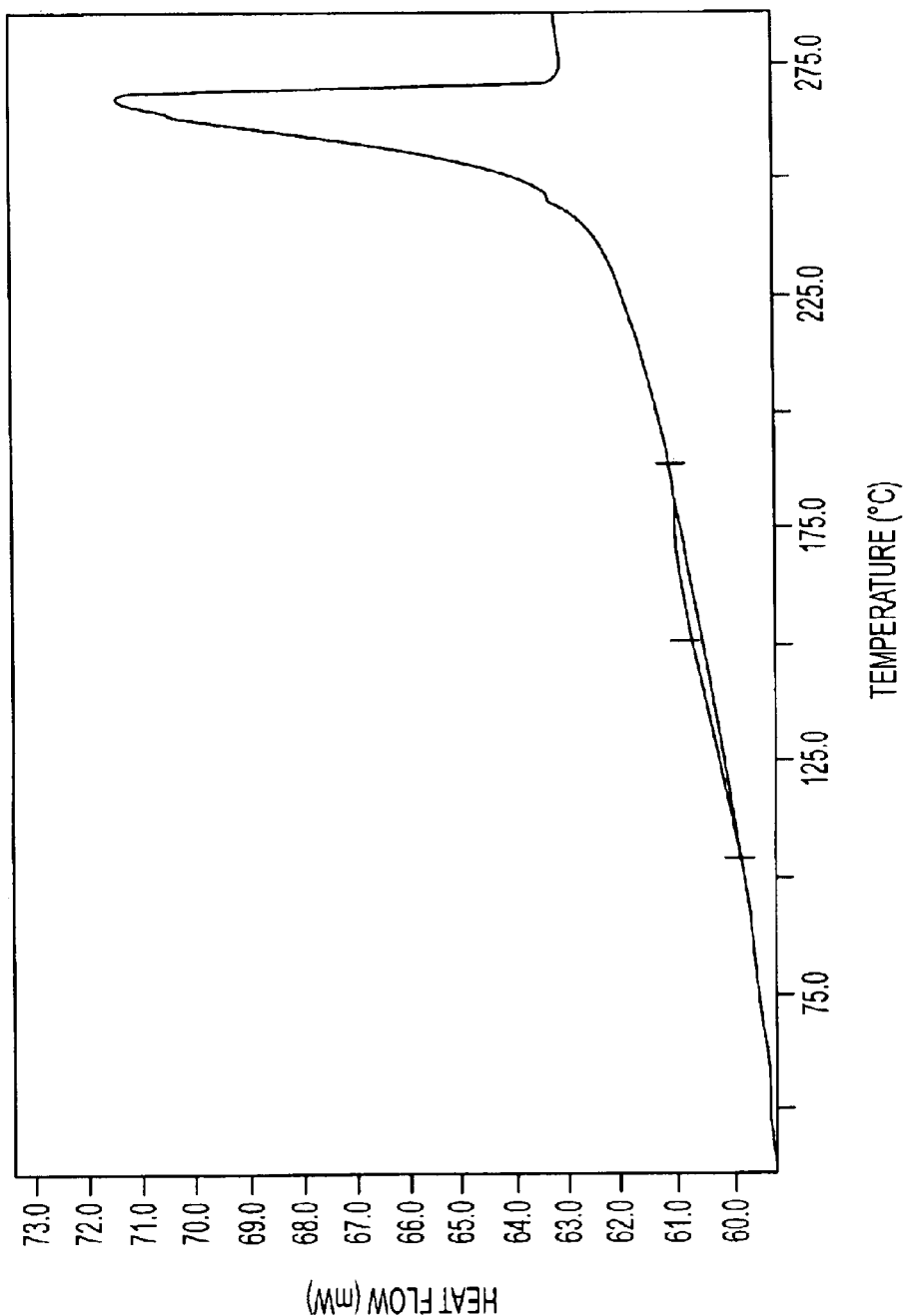
FIG. 3 is a diagram illustrating a curve of measurement of the polyester at the shoulder portion of the container of the present invention as measured by using the differential scanning calorimeter.

FIG. 3 is a diagram illustrating a curve of measurement of the polyester at the shoulder portion of the container of the present invention as measured by using the differential scanning calorimeter, exhibiting an endothermic peak (S) due to the melting pseudo crystals on the low temperature side in addition to an endothermic peak (A) due to the melting crystals.

Formation of the pseudo crystals in the shoulder portion is helpful in improving the heat resistance and the resistance against heat and pressure in the shoulder portion of the container, e.g., in preventing the shoulder portion from deforming in the step of hot filling or sterilization by hot water or in the step of cooling, improving appearance of the bottled products.

From the above-mentioned point of view, it is desired that the endothermic amount at the endothermic peak (S) due to the extinction of the pseudo crystals of the polyester at the shoulder portion of the container is not smaller than 5% and, particularly, from 7 to 15% of the melting endothermic amount of the crystals.

In the stretch-blow-molded container of the present invention, the polyester at the body portion of the container does not have an endothermic peak (D) due to the extinction of the pseudo crystals or has a very small endothermic peak (D).

The reason is presumably due to that the pseudo crystals formed in the step of heat treatment are broken by the stretching in the secondary blow-molding in the body portion.

Figure 4:
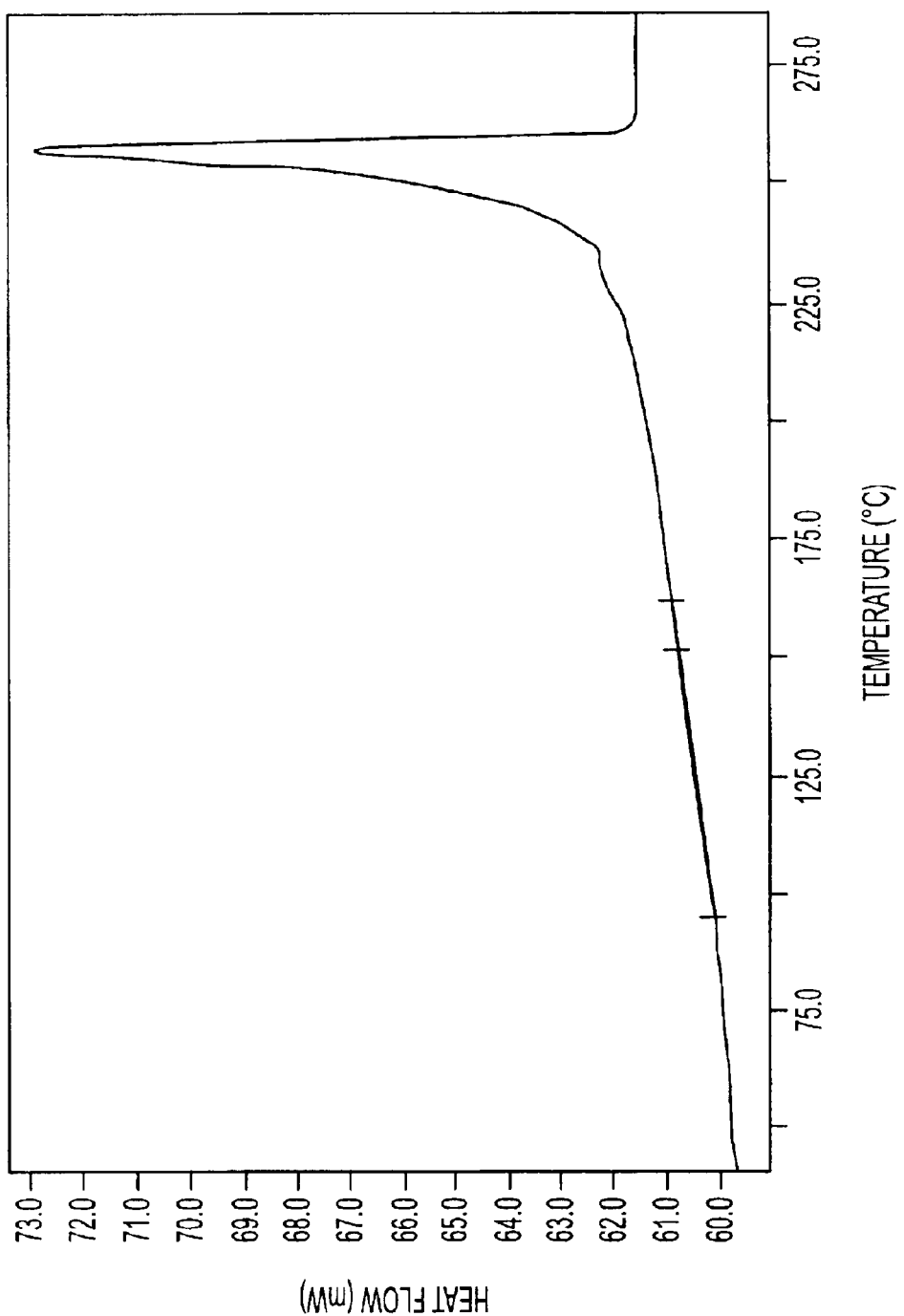
FIG. 4 is a diagram illustrating a curve of measurement of the polyester at the body portion of the container of the present invention as measured by using the differential scanning calorimeter.

FIG. 4 is a diagram illustrating a curve of measurement of the polyester at the body portion of the container of the present invention as measured by using the differential scanning calorimeter, exhibiting an endothermic peak (A) due to the melting crystals and an endothermic peak (D) due to the melting pseudo crystals on the low temperature side, the peak area (endothermic amount) of the endothermic peak (D) being considerably small.

The container of the present invention has a feature in that the endothermic amount at the endothermic peak due to the extinction of the pseudo crystals is the greatest in the central portion of the bottom, next greatest in the shoulder portion and is the smallest in the body portion in a temperature region higher than the glass transition point of the polyester but lower than the temperature at which the crystals of the polyester start melting.

If the endothermic amount at the endothermic peak at the central portion of the bottom is denoted by $H_B$, the endothermic amount at the endothermic peak of the shoulder portion by $H_S$ and the endothermic amount at the endothermic peak at the body portion by $H_D$, a relationship among them is generally expressed by the following formula (1), $$H_B > H_S > H_D \tag{1}$$

The container having the above-mentioned distribution of pseudo crystals of the polyester is particularly excellent in the balance of heat resistance and the resistance against heat and pressure when the container as a whole is considered. The degree of pseudo crystallization is great in the center of the bottom where the degree of molecular orientation is the smallest but which is the most important from the standpoint of self-standing stability, the degree of pseudo crystallization is small in the body portion where the degree of molecular orientation is the greatest, and the degree of pseudo crystallization is intermediate in the shoulder portion where the degree of molecular orientation is intermediate.

The present invention exhibits particularly excellent effect when it is concerned with a self-standing container of the one-piece type having foot portions and valley portions alternatingly arranged on the bottom portion in the circumferential direction, the valley portions being located on an imaginary plane which protrudes downward in the axial direction of the container.

In the container of this type, the central portion of the bottom is at the lowermost position on the above-mentioned imaginary curved plane. The present invention suppresses the central portion of the bottom from being deformed by creeping at the time of sterilization by heating, preventing the container from losing self-standing performance and stability.

Constitution of the Container Wall

In the present invention, the material constituting the container is a thermoplastic polyester that can be stretch-blow-molded and heat crystallized and, particularly advantageously, an ethylene terephthalate-type thermoplastic polyester. It is, of course, allowable to use any other polyester such as polybutylene terephthalate or polyethylene naphthalate, or a blend thereof with a polycarbonate or an arylate resin.

Further, the material constituting the container may be of a single-layer constitution or of a multi-layer constitution of two or more layers in a range in which the principal material is a polyester.

In the ethylene terephthalate-type thermoplastic polyester used in the present invention, most of the ester recurring unit and, usually, not less than 70 mol % and, particularly, not less than 80 mol % of the ester recurring unit is constituted by an ethylene terephthalate unit. It is desired to use a thermoplastic polyester having a glass transition point (Tg) of from 50 to 90° C. and, particularly, from 55 to 80° C, and a melting point (Tm) of from 200 to 275° C. and, particularly, from 220 to 270° C.

A homopolyethylene terephthalate is desired from the standpoint of heat resistance and resistance against heat and pressure but it is also allowable to use a copolymerized polyester containing a small amount of an ester unit other than the ethylene terephthalate unit.

As a dibasic acid other than the terephthalic acid, there can be used any one of an aromatic dicarboxylic acid such as isophthalic acid, phthalic acid, or naphthalenedicarboxylic acid; an alicyclic dicarboxylic acid such as cyclohexanedicarboxylic acid; an aliphatic dicarboxylic acid such as succinic acid, adipic acid, sebacic acid, or dodecanedioic acid, or a combination of two or more kinds thereof. As a diol component other than the ethylene glycol, there can be exemplified one or two or more of propylene glycol, 1,4-butane diol, diethylene glycol, 1,6-hexylene glycol, cyclohexane dimethanol and ethylene oxide adduct of bisphenol A.

It is also allowable to use a composite material obtained by blending the ethylene terephthalate-type thermoplastic polyester with, for example, a polyethylene naphthalate, a polycarbonate or a polyacrylate having a relatively high glass transition point in an amount of from about 5% to about 25%, in order to increase the strength of the material of when the temperature is relatively high.

It is further allowable to use the polyethylene terephthalate and the above-mentioned material having a relatively high glass transition point in the form of laminated layers.

The ethylene terephthalate-type thermoplastic polyester must have a molecular weight at least large enough for forming a film, and there are used those of the injection grade or those of the extrusion grade depending upon the applications. It is desired that it has an intrinsic viscosity (I.V.) in a range of generally from 0.6 to 1.4 dL/g and, particularly, from 0.63 to 1.3 dL/g.

In the container of the present invention, the above-mentioned ethylene terephthalate-type polyester is used as an inner layer and an outer layer, and there are interposed, as intermediate layers, a recycled polyester layer, a gas-barrier resin layer and an oxygen-absorbing resin layer.

As the recycled polyester layer, there can be used the one obtained by washing and regenerating the pulverized polyester recovered from the used PET bottles.

As the gas barrier resin, there can be used an ethylene vinyl alcohol copolymer and, particularly, an ethylene vinyl alcohol copolymer containing 20 to 60 mol % of an ethylene, a polyamide resin and, particularly, nylon 6, nylon 6,6 and polyxylyleneadipamide (MXD 6).

As the oxygen-absorbing layer, there can be used any known oxygen-absorbing resin composition. Representative examples include polyamide resin and, particularly, the MXD 6 blended with a transition metal catalyst and, particularly, a carboxylate of cobalt.

Container and Production Thereof

The stretch-blow-molded container of the present invention is obtained by primary blow-molding the preform, heat-treating the bottom portion, body portion and shoulder portion of the primary blow-molded article, and secondary blow-molding the heat-treated article.

Figure 6:
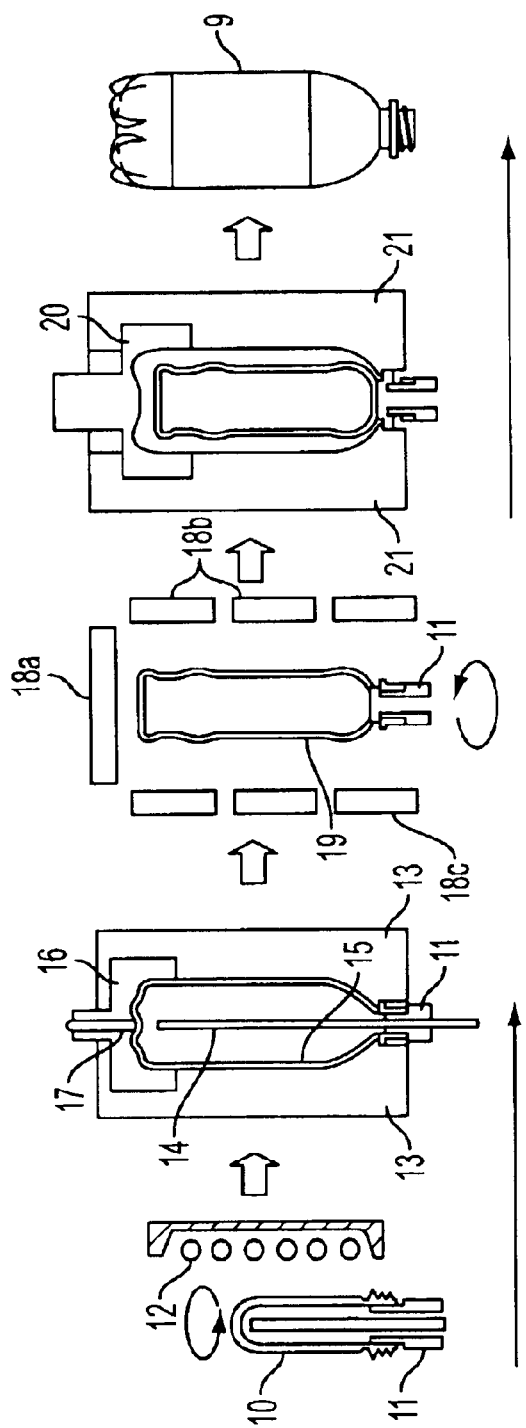
FIG. 6 is a diagram illustrating the steps for producing the biaxially stretched blow-molded containers of the present invention.

Reference is now made to FIG. 6 to illustrate the steps of production. Referring, first, to a step of pre-heating, a preform 10 formed of the above-mentioned polyester or the like is supported by a mandrel 11 and is heated at a stretching temperature by using a heating device 12 such as an infrared-ray heating device.

Next, in a step of primary blow-molding, the heated preform 10 is put into a blow metal mold 13 that can be opened and closed, pulled and stretched in the axial direction by using a stretching rod 14, and is blow-stretched in the circumferential direction by blowing a gas through the mouth-and-neck portion held by the mandrel 11. In the primary blow-molding, a bottom metal mold 16 and a press rod 17 can be used to mold the bottom of the primary blow-molded article 15 in a desired shape.

Then, the primary blow-molded article 15 inclusive of its bottom portion, body portion and shoulder portion is subjected to the heat treatment. The infrared-ray heating device for heat treatment includes an infrared-ray heating portion 18a for heating the bottom portion, an infrared-ray heating portion 18b for heating the body portion and an infrared-ray heating portion 18c for heating the shoulder portion. The bottom portion, body portion and shoulder portion of the primary blow-molded article undergo the contraction due to the heat treatment, and there is obtained a heat-treated article 19 that has been heat-set.

Finally, in a step of secondary blow-molding, the heat-treated article 19 is put into a secondary blow metal mold 21 that is equipped with a bottom mold 20 and can be opened and closed, and is blow-stretched by blowing a pressurized gas through the mouth-and-neck portion of the heat-treated article 19 held by the mandrel 11 to mold it into a final container 9.

Figure 7:
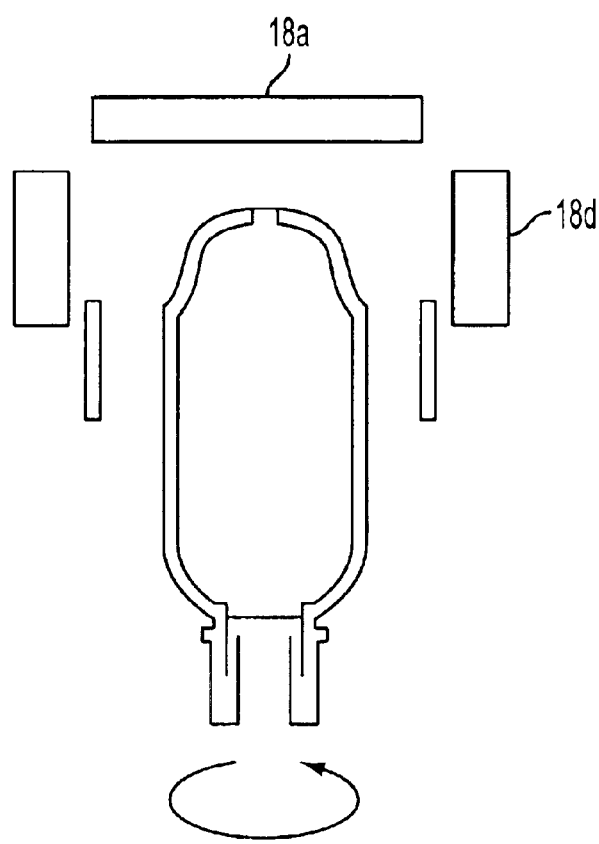
FIG. 7 is a diagram illustrating another infrared-ray heating device used in the step of producing the biaxially stretched blow-molded containers of the present invention.

In the above-mentioned steps of production, the infrared-ray heating device for heat treatment may be constituted by an infrared-ray heating portion 18a for heating the bottom portion and an infrared-ray heating portion 18d in the vicinity thereof as shown in FIG. 7.

In the stretch-blow-molded container of the present invention as described already, a feature resides in that at least the central portion of the bottom has pseudo crystals that appear as an endothermic peak in the differential scanning calorimetric analysis. The pseudo crystals in the bottom portion appear through the heat treatment described above, but tend to be extinguished or broken by the secondary blow-molding.

Therefore, it is important that the pseudo crystals are effectively formed in the central portion of the bottom by the heat treatment and that the central portion of the bottom is blow-stretched to only a small degree in the secondary blow molding.

(1) Preform

A cylindrical preform with bottom is used for forming the container of the present invention. The preform used for the present invention includes a mouth-and-neck portion, a cylindrical body portion and a closed bottom portion. The mouth-and-neck portion is provided with a closure-fastening mechanism such as a screw or the like and with a support ring for holding the container. The mouth-and-neck portion of the preform serves as the mouth-and-neck portion of the final container. The mouth-and-neck portion can be heat-crystallized in order to improve the heat resistance and to improve the sealing accuracy.

The polyester can be formed into a preform by the injection-molding. That is, the polyester is melt-injected into the cooled injection mold and is molded into a supercooled amorphous polyester preform.

A multi-layer preform is injection-molded by using screws or plungers of a number corresponding to the kinds of the resin layers, and injection-molding the polyester simultaneously or sequentially through multi-layered and multiplex nozzles.

As the injection machine, there can be used a known one equipped with an injection plunger or a screw. The polyester is injected into the injection mold through a nozzle, a sprue and a gate. Then, the polyester flows into the cavity in the injection mold and is solidified to form a preform that is to be stretch-blow molded.

The injection mold is the one having the cavity corresponding to the shape of the container, and is, preferably, the one which is of the one-gate type or of the multi-gate type.

It is desired that the injection temperature is from 270 to 310° C. and the pressure is from about 28 to about 110 kg/cm$^2$.

The mouth-and-neck portion of the preform is heat-crystallized, as required, by selectively heating these portions by known means. The polyester is heat-crystallized to a conspicuous degree at a specific crystallization temperature. Usually, therefore, the corresponding portions of the preform may be heated at a crystallization temperature. The heating is accomplished by infrared-ray heating or induction heating. Usually, the body portion to be stretched is shut off from the source of heat with a heat-insulating member to effect the selective heating.

The above heat-crystallization may be effected simultaneously with, or separately from, the pre-heating at the stretching temperature of the preform. The mouth portion is heat-crystallized at a temperature of, usually, from 140 to 220° C. and, particularly, from 160 to 210° C. in a state where they are thermally insulated from other portions. It is desired that the crystallinity of the mouth portion of the preform is not smaller than 25%.

The preform can be molded even by the compression-molding.

In this case, a molten mass of nearly a predetermined amount obtained by cutting the extruded polyester is supplied into a cavity mold without substantially dropping the temperature, and is readily compression-molded using the core mold. It is desired that the molten mass is compression-molded into the preform having a body portion with bottom and having a mouth portion while quickly discharging the residual air in the mold.

Production of the preform by the compression-molding offers such advantages that the preform has no residual gate portion in the bottom, that the preform is molded with a relatively small pressure and that the preform stays in the mold for a shortened period of time.

The preform is stretched at a temperature of, generally, from 85 to 135° C. and, particularly, from 90 to 13° C. In this case, it is desired that a difference between the temperature for heating the bottom portion of the preform and the temperature for heating the body portion is not larger than 10° C.

The preform that is molded can, then, be stretch-blow-molded by utilizing the heat given to the preform that is molded, i.e., by utilizing the remaining heat. In general, however, it is desired to once prepare a preform-molded article in a supercooled state and to stretch-blow-mold the preform by heating it at the above-mentioned stretching temperature (cold parison method).

The heating is effected by a known means such as infrared-ray heating, hot air heating furnace or induction heating. It is generally desired to support the mouth-and-neck portion of the preform with a core metal mold, and hold the preform in a heating device (heating furnace) provided with a source of infrared-rays while turning it, in order to evenly heat the body portion and the bottom portion at a stretching temperature.

It is desired that the stretching ratio is from 2 to 5 times as great and, particularly, from 2.2 to 4 times as great in the axial direction, and from 2.5 to 6.6 times as great and, particularly, from 3 to 6 times as great in the circumferential direction. The stretching ratio in the axial direction is determined by the length of the preform-molded article in the axial direction and the length of stroke of the stretching rod, whereas the stretching ratio in the circumferential direction is determined by the diameter of the preform and the diameter of the metal mold cavity.

As the pressurized fluid, there can be used the air or any other gas, such as nitrogen gas, carbon dioxide gas or water vapor of room temperature or of an elevated temperature, being pressurized, usually, under 10 to 40 kg/cm² gauge and, particularly, under 15 to 30 kg/cm² gauge.

It is further desired that the primary blow metal mold is maintained at a temperature, usually, in a range of from 15° C. to 100° C.

In the step of primary blow molding, the preform is held in the cavity defined by a pair of split metal molds with the mouth-and-neck portion thereof being supported by the core metal mold. On the side opposite to the mandrel, there is disposed a bottom metal mold to define the bottom shape of the primary blow-molded article.

The preform is pulled and stretched in the axial direction by inserting the stretching rod in the preform, by pushing the central portion of the bottom of the preform by a tip of the stretching rod, and by blowing the fluid into the preform, so that the preform is expansion-stretched in the circumferential direction.

It is desired that the stretching ratio is from 2 to 5 times as great and, particularly, from 2.2 to 4 times as great in the axial direction, and is from 2.5 to 6.6 times as great and, particularly, from 3 to 6 times as great in the circumferential direction. The stretching ratio in the axial direction is determined by the length of the preform-molded article in the axial direction and the length of stroke of the stretching rod, whereas the stretching ratio in the circumferential direction is determined by the diameter of the preform and the diameter of the metal mold cavity.

As the pressurized fluid, there can be used the air or any other gas, such as nitrogen gas, carbon dioxide gas or water vapor of room temperature or of an elevated temperature, being pressurized, usually, under 10 to 40 kg/cm² gauge and, particularly, under 15 to 30 kg/cm² gauge.

It is desired that the pressing rod is disposed on the side of the bottom metal mold in concentric with the stretching rod at the time of the primary blow-molding, and that, at the time of tensile stretching, the central portion of the bottom of the preform is held by the stretching rod and by the pressing rod so as to be correctly positioned at the center of the primary blow-molded article at where the central portion of the bottom of the preform is formed.

It is further desired that the bottom metal mold is roughly of a dome shape having a large radius of curvature in order to highly stretch the bottom portion of the secondary molded article. In particular, it is effective if a flat portion is formed in the central portion of the bottom.

In conducting the primary blow-molding, it is desired that the drop of temperature of the portion holding the bottom portion of the preform is suppressed to be not larger than 40° C. and, more preferably, not larger than 30° C. until the stretching work ends. This makes it possible to maintain the bottom portion of the secondary molded article in a relatively highly stretched state so as to possess a decreased thickness except the central portion of the bottom which is the portion being held.

There is no particular limitation on the means for preventing the drop of temperature at the holding portion in the bottom of the preform. For example, a grip portion made of a heat-insulating member such as a polytetrafluoroethylene is attached to the tip of the stretching rod, so that the drop of temperature due to the conduction of heat is decreased as much as possible at the central portion of the bottom. For the same purpose, the tip of the pressing rod, too, may be fitted with a grip portion made of a heat-insulating material such as the polytetrafluoroethylene.

It is desired that the bottom of the obtained primary blow-molded article is oriented and crystallized in a relatively highly stretched state so as to possess the oriented crystallinity of not smaller than 20% and, more preferably, not smaller than 25%, and has a thickness of not larger than 1 mm and, more preferably, not larger than 0.8 mm except the central portion of the bottom.

In the step of heat-treating the primary blow-molded article, the primary blow-molded article is supported by the mandrel and is rotated in a manner that the bottom portion, body portion and shoulder portion of the primary blow-molded article are opposed to the infrared-ray heating members. Accordingly, the primary blow-molded article has its bottom portion, body portion and shoulder portion heated by infrared-rays emitted from the infrared-ray heating members, contracted in the direction of height and in the radial direction, so as to assume a shape that can be held in the secondary blow metal mold that corresponds to the shape of the final container.

Due to the heat treatment according to the present invention, pseudo crystals are formed simultaneously with the crystallization of the polyester of the molecularly oriented container wall and with the relaxing of strain due to stretching caused by the primary blow-molding. Formation of the pseudo crystals can be confirmed through the differential scanning calorimetric (DSC) measurement as described already.

The endothermic peak temperature (Tp) caused by the extinction of the pseudo crystals is intimately related to the temperature of the heat treatment, and a peak tends to appear at the heat-treatment temperature or in the vicinities thereof. If the heat-treatment temperature is denoted by Tt, the endothermic peak temperature (Tp) is, usually, in a range of from Tt−100° C. to Tt+40° C.

The conditions of heat treatment may differ depending upon the kind of the polyester and the condition of the primary blow-molding. In general, however, the temperature is selected from 150 to 220° C. and, particularly, from 160 to 200° C. and the treatment time is selected from 5 to 15 seconds and, particularly, from 7 to 10 seconds, so that the pseudo crystals are formed in the final container to a degree that lies in the above-mentioned range.

It is desired that the degree of contraction at the central portion of the bottom due to the heat treatment is suppressed to be as small as possible compared to the body portion or the shoulder portion. When the degree of contraction is great, the degree of stretch-blow tends to increase in the subsequent secondary blow-molding, and the pseudo crystals are extinguished to a large extent.

The heating from the infrared-ray radiation members is of the non-contact type and, hence, the bottom portion, body portion and shoulder portion are contracted without being held. Further, the infrared rays falling on the surface of the primary blow-molded article are partly absorbed by the container wall, and the remaining part passes through the container wall, arrives at the inner surface on the opposite side facing the irradiating portion and is absorbed thereby. Accordingly, the heating is effected very efficiently, within short periods of time and evenly with infrared rays from the inner and outer surfaces.

In the step of secondary blow-molding, the heat-treated molded article is inserted in the secondary blow metal mold with its neck portion being supported by the core metal mold. On the opposite side of the core metal mold, there is inserted the bottom metal mold to define the bottom shape of the final container. The split mold is closed, the fluid is blown into the heat-treated article which is, then, secondary blow-molded to form the final container having a desired shape.

In the secondary blow-molding, the heat-treated article that is to be blown exhibits an increased elasticity due to the crystallization by the heat treatment. It is, therefore, desired that the heat-treated article is blow-molded by utilizing a high hydraulic pressure which is, usually, from 15 to 45 kg/cm².

In conducting the secondary blow-molding, the metal mold may be maintained at a temperature of from 5 to 135° C. and may be cooled readily after the molding, or the cold air may be blown into the finally molded article to cool it.

In conducting the secondary blow-molding, the pseudo crystals formed by the heat treatment tend to be broken or extinguished in the portions that are stretch-blown to a large extent.

In secondary blow-molding the container of the present invention, the central portion of the bottom is stretch-blown to the smallest degree and, hence, the pseudo crystals remain therein to the greatest extent, the body portion is stretch-blown to the largest degree and, hence, the pseudo crystals remain to the smallest extent, and the shoulder portion contains the pseudo crystals to an extent between that of the central portion of the bottom and that of the body portion.

In conducting the secondary blow-molding, it is desired that the central portion of the bottom of the heat-treated product is as close to the central portion of the bottom of the secondary blow metal mold as possible, so that the pseudo crystals remain to a large extent and that the strain due to stretching decreases. This further facilitates the formation of the foot portions of the final product.

In the container of the present invention, it is desired that the crystallinity as found by the density method is from 40 to 50% in the central portion of the bottom, from 35 to 45% in the body portion and from 30 to 40% in the shoulder portion, from the standpoint of heat resistance and pressure resistance.

The crystallinity ($X_c$) based on the density method is calculated from the sample density ($\rho$), amorphous density ($\rho am$, 1.335 g/cm³) and crystalline density ($\rho c$, 1.455 g/cm³) in compliance with the following formula, $$Xc = (\rho c/\rho) \times [(\rho - \rho am)/(\rho c - \rho am)]$$

It is desired that the bottom of the container of the present invention has foot portions and valley portions alternatingly arranged in the circumferential direction, the number of the foot portions being from 6 to 4 and, particularly preferably, from 6 to 5 from the standpoint of self-standing stability.

The valley portions inclusive of the central portion of the bottom are located on an imaginary curved plane protruded downward, e.g., on a roughly spherical plane or on an oval plane of revolution. It is desired that the radius of curvature of the curved plane is in a range of from 0.9 to 1.2 times as large as the radius of the body portion.

EXAMPLES

The invention will be further described by way of the following Examples to which only, however, the invention is in no way limited.

Example 1

The mouth portion of a preform made of a polyethylene terephthalate resin was crystallized by a suitable means. Then, the preform was heated at 110° C. which was higher than the glass transition point, and was biaxially stretched and blow-molded at stretching ratios of 3.0 times in the longitudinal direction, 3.0 times in the transverse direction and into 9 times as wide in area by using a primary metal mold maintained at a temperature of 60° C. to obtain a primary molded article having a body diameter of 64.3 mm and a height of 253.6 mm, which was larger than the finally molded polyester bottle.

Then, the bottom portion, body portion and shoulder portion of the thus obtained primary molded article were heated by an oven heated at 800° C. for 5 seconds, so that the surfaces thereof were heated at a temperature of 150° C. in average and were thermally contracted to obtain a secondary molded article. Then, the secondary molded article that was thermally shrunk was biaxially stretched and blow-molded by using a secondary metal mold maintained at a temperature of 60° C. in order to obtain a polyester bottle of a circular shape in transverse cross section having a body diameter of 64.3 mm, a height of 207.2 mm and a volume of 500 ml.

FIG. 2 is a diagram illustrating a curve of measurement of the central portion of the bottom (residual gate portion) of the container as measured by using a differential scanning calorimeter, FIG. 3 is a diagram illustrating a curve of measurement of the shoulder portion measured by using the differential scanning calorimeter, and FIG. 4 is a diagram illustrating a curve of measurement of the body portion as measured by using the differential scanning calorimeter.

The polyester bottle was filled with hot water heated at 85° C. and was sealed with a plastic cap made of a polypropylene. The bottle was left to stand still for 10 minutes and was allowed to cool down to room temperature. The volume contraction ratio at this time was 1.83% which was within a permissible range for use as a heat-resistant bottle.

The bottle was then filled with carbonated water of 5° C. and 2.6 GV, immersed in a hot bath maintained at 70° C. for 32 minutes, and was cooled down to room temperature. The bottle retained self-standing performance.

Therefore, the bottle of Example 1 can be used in applications where heat resistance and resistance against heat and pressure are required.

Comparative Example 1

The operation was conducted in the same manner as in Example 1 but effecting the biaxial stretching and blow-molding by using the primary metal mold only maintained at a temperature of 150° C. to obtain a polyester bottle having stretching ratios of 3 times in the longitudinal direction, 3 times in the transverse direction, 9 times as wide in area, and a circular shape in transverse cross section with a body diameter of 69.2 mm and a height of 209.4 mm.

The polyester bottle obtained as described above was filled with hot water heated at 85° C. and was sealed with a plastic cap made of a polypropylene. The bottle was left to stand still for 10 minutes and was allowed to cool down to room temperature. The volume contraction ratio at this time was 0.023%.

The bottle was then filled with carbonated water of 5° C. and 2.6 GV, immersed in a hot bath maintained at 70° C. for 32 minutes, and was cooled down to room temperature.

However, the bottle lost self-standing performance due to protrusion of the bottom portion.

Therefore, the bottle of Example 1 can be used in applications where heat resistance is required but cannot be used in applications where resistance against heat and pressure is required.

Industrial Applicability

In dealing with a container obtained by stretch-blow-molding a polyester, it was found, according to the present invention, that a pseudo crystalline structure which is independent from the crystals inherent in the polyester can be introduced into at least the central portion of the bottom. Upon introducing the pseudo crystalline structure, the heat resistance can be improved at temperatures lower than the melting point of the pseudo crystals and, hence, the heat resistance or the resistance against heat and pressure, as well as the self-standing performance of the container after the sterilization can be strikingly improved particularly when the container has a bottom portion constituted by a plurality of foot portions and a plurality of valley portions.

What is claimed is:

1. A stretch-blow-molded container obtained by stretch-blow-molding a preform formed of a thermoplastic polyester as a chief component, wherein the body portion, bottom portion and shoulder portion are stretch-oriented, and at least the central portion in the bottom has an endothermic peak (B) due to the extinction of pseudo crystals in a temperature region higher than a glass transition point of the polyester but lower than a temperature at which the crystals of the polyester start melting as measured by using a differential scanning calorimeter (DSC).

2. A stretch-blow-molded container according to claim 1, wherein an endothermic amount at the endothermic peak (B) due to the extinction of the pseudo crystals is not smaller than 8% of the melting endothermic amount of the crystals.

3. A stretch-blow-molded container according to claim 2, wherein said shoulder portion, too, has an endothermic peak (S) due to the extinction of the pseudo crystals in a temperature region higher than the glass transition point of the polyester but lower than the temperature at which the crystals of the polyester start melting as measured by using the differential scanning calorimeter (DSC).

4. A stretch-blow-molded container according to claim 1, wherein said shoulder portion, too, has an endothermic peak (S) due to the extinction of the pseudo crystals in a temperature region higher than the glass transition point of the polyester but lower than the temperature at which the crystals of the polyester start melting as measured by using the differential scanning calorimeter (DSC).

5. A stretch-blow-molded container according to claim 4, wherein an endothermic amount at the endothermic peak (S) due to the extinction of the pseudo crystals is not smaller than 5% of the melting endothermic amount of the crystals.

6. A stretch-blow-molded container according to claim 1, wherein an endothermic amount at the endothermic peak (B) due to the extinction of the pseudo crystals is the greatest in the central portion of the bottom, next greatest in the shoulder portion and is the smallest in the body portion in a temperature region higher than the glass transition point of the polyester but lower than the temperature at which the crystals of the polyester start melting.

7. A stretch-blow-molded container according to claim 1, wherein said container is obtained through a primary blow-molding of the preform, through the heat-treatment of the bottom portion, body portion and shoulder portion of the primary blow-molded article, and through the secondary blow-molding of the heat-treated article.

8. A stretch-blow-molded container according to claim 1, wherein said bottom portion is constituted by foot portions and valley portions alternatingly arranged in the circumferential direction, the valley portions having a self-standing structure located on an imaginary curved plane protruding downward in the axial direction of the container.

* * * * *